(12) United States Patent
Andersson et al.

(10) Patent No.: US 9,107,082 B2
(45) Date of Patent: Aug. 11, 2015

(54) ARRAY ANTENNA ARRANGEMENT

(71) Applicant: TELEFONAKTIEBOLAGET L M ERICSSON (PUBL), Stockholm (SE)

(72) Inventors: Mats H. Andersson, Göteborg (SE);
Martin Johansson, Mölndal (SE); Bo Göransson, Sollentuna (SE); Ulrika Engström, Floda (SE); Anders Derneryd, Göteborg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 14 days.

(21) Appl. No.: 14/153,431

(22) Filed: Jan. 13, 2014

(65) Prior Publication Data
US 2014/0120923 A1 May 1, 2014

Related U.S. Application Data

(63) Continuation of application No. 13/302,199, filed on Nov. 22, 2011, now Pat. No. 8,666,451, which is a continuation of application No. 12/160,139, filed as application No. PCT/EP2006/000035 on Jan. 4, 2006, now abandoned.

(51) Int. Cl.
*H04M 1/00* (2006.01)
*H04W 16/28* (2009.01)
(Continued)

(52) U.S. Cl.
CPC .............. *H04W 16/28* (2013.01); *H04B 7/0417* (2013.01); *H04B 7/0617* (2013.01); *H04B 7/0619* (2013.01); *H04W 84/042* (2013.01)

(58) Field of Classification Search
USPC .......... 455/562.1, 575.5, 575.7, 107; 375/267
See application file for complete search history.

(56) References Cited

U.S. PATENT DOCUMENTS

| 6,147,648 A | 11/2000 | Granholm et al. |
| 6,760,603 B1 | 7/2004 | Scherzer et al. |

(Continued)

FOREIGN PATENT DOCUMENTS

| JP | 2005-136492 A | 5/2005 |
| JP | 2005-191878 A | 7/2005 |
| WO | WO 02/082689 A2 | 10/2002 |

OTHER PUBLICATIONS

Wei Dai, et al: "On the information Rate of MIMO Systems with Finite Rate Channel State Feedback and Power On/Off Straregy". ISIT. Sep. 4, 2005.

(Continued)

*Primary Examiner* — Kent Chang
*Assistant Examiner* — Scott Au

(57) ABSTRACT

A wireless communication system comprising at least one base station in a communication cell, wherein the base station is equipped with at least one array antenna comprising at least two antenna ports which are connected to respective at least two corresponding antenna elements, wherein at least two of the at least two antenna elements have essentially the same polarization. The array antenna is arranged for communication via at least two antenna radiation lobes, each antenna radiation lobe communicating an information stream to at least one user equipment (UE) in the cell, wherein each antenna radiation lobe is individually controllable both in azimuth and elevation, whereby the communication of the information streams is optimized.

23 Claims, 4 Drawing Sheets

(51) Int. Cl.
*H04B 7/06* (2006.01)
*H04B 7/04* (2006.01)
*H04W 84/04* (2009.01)

(56) References Cited

U.S. PATENT DOCUMENTS

| | | |
|---|---|---|
| 7,072,611 B2 | 7/2006 | Shapira |
| 7,408,898 B1 | 8/2008 | Brown |
| 7,593,486 B2 | 9/2009 | Jeong et al. |
| 7,855,690 B2 | 12/2010 | Hook et al. |
| 2002/0132600 A1 | 9/2002 | Rudrapatna |
| 2002/0140602 A1 | 10/2002 | Chang et al. |
| 2003/0185309 A1 | 10/2003 | Pautler et al. |
| 2004/0014502 A1 | 1/2004 | Shurvinton et al. |
| 2005/0075139 A1 | 4/2005 | Shapira |
| 2005/0181739 A1 | 8/2005 | Krasny et al. |
| 2005/0181831 A1 | 8/2005 | Doi |
| 2005/0276317 A1 | 12/2005 | Jeong et al. |
| 2006/0084474 A1 | 4/2006 | Iacono et al. |
| 2006/0093055 A1 | 5/2006 | Goldberg |

OTHER PUBLICATIONS

Wei Dai, et al: "Quantization Bounds on Grassmann Manifolds of Arbitrary Dimensions and MIMO Communications with Feedback". Globecom '05. Nov. 28, 2005.

ARRAY ANTENNA ARRANGEMENT

CROSS-REFERENCE TO RELATED APPLICATIONS

This application is a continuation of U.S. application Ser. No. 13/302,199, filed Nov. 22, 2011, now U.S. Pat. No. 8,666, 451, which is a continuation of U.S. application Ser. No. 12/160,139, filed Jul. 7, 2008, now abandoned, which is a 371 of International Application No. PCT/EP06/00035, filed Jan. 4, 2006, the disclosures of which are incorporated herein by reference.

TECHNICAL FIELD

The present invention relates to a wireless communication system comprising at least one base station in a communication cell, the base station being equipped with at least one array antenna comprising at least two antenna ports, where the at least two ports are connected to respective at least two corresponding antenna elements, where at least two of the at least two antenna elements, have essentially the same polarization.

According to a certain aspect of the invention, in a first mode of operation, the array antenna is arranged for communication via one antenna radiation lobe, communicating one information stream to at least one UE (user equipment) in the cell.

The present invention also relates to a method for communication of at least one information stream from a base station array antenna in a communication cell, the base station array antenna comprising at least two antenna ports, where the at least two ports are connected to respective at least two corresponding antenna elements, where at least two of the at least two antenna elements have essentially the same polarization.

According to a certain aspect of the invention, in a first mode of operation, the method comprises the step: communicating one information stream, to at least one UE (user equipment) in the cell, via one antenna radiation lobe.

BACKGROUND ART

The demand for wireless communication systems has grown steadily, and is still growing, and a number of technological advancement steps have been taken during this growth. In order to acquire increased system capacity and user data bit rate for wireless systems by employing de-correlated propagation paths, MIMO (Multiple Input Multiple Output) systems have been considered to constitute a preferred technology for improving the capacity and the user data bit rate. MIMO employs a number of separate independent signal paths, for example by means of several transmitting and receiving antennas.

Generally, a MIMO system utilizes de-correlated, or at least essentially de-correlated, transmitted signals. The meaning of the term "de-correlated signals" in this context is that the radiation patterns are essentially de-correlated. This is today made possible by means of spatial separation, i.e. having at least two antennas separated by 5-10 wavelengths, (calculated from the centre frequency of the frequency band for which the antennas are designed), normally in azimuth, in order to achieve low correlation between the signals at the antenna ports. These at least two antennas have at least one antenna radiation lobe each.

It is also possible to combine spatial separation with polarization separation, where the antennas then also are arranged for transmission and reception of signals having orthogonal polarizations.

A base station in a MIMO system may thus be arranged with a number of antennas, separated by 5-10 wavelengths, each one of the base station antennas either being designed for one polarization or a plurality of essentially de-correlated polarizations, typically two essentially de-correlated polarizations. These antennas produce antenna radiation lobes which are de-correlated, either by space or polarization, or both.

It is necessary that a user equipment (for example a mobile phone or a portable computer) is arranged with at least two antenna ports for communication in a MIMO system.

A problem with existing MIMO arrangements is that, since an original information stream is divided into two or more separate information streams, the SNR (Signal to Noise Ratio) is deteriorated given a fixed output power. A decreased SNR results in that the rate of transferred data, the data bit rate, is decreased.

Furthermore, the signal path between the base station and the user equipment may be blocked by a number of objects such as large buildings in an urban environment, which objects cause a number of reflections. These reflections may result in that the signal to noise ratio (SNR) becomes even more deteriorated, and thus the signals transmitted between the base station and the user equipment may become more and more noisy the more buildings that are in the way. It may thus be possible to use MIMO only in the vicinity of a base station. A good MIMO performance requires good SNR.

The traditional MIMO systems, having one information stream per antenna, are thus afflicted with a disadvantage concerning the data bit rate between the base station and the user equipment, both in urban environments and in the countryside, due to the fact that the base station antenna radiation lobes are spatially separated in order to obtain essentially de-correlated signals. This means that the MIMO system is not used optimally, for a given surface area and output power.

DISCLOSURE OF THE INVENTION

The objective problem that is solved by the present invention is to provide an arrangement suitable for a MIMO system, which arrangement is capable of providing an enhanced communication between a base station, having at least two antenna ports, and a user equipment, having at least two antenna ports for communication via the at least two base station antenna radiation lobes.

The objective problem is solved by means of a wireless communication system according to the introduction, where the array antenna is arranged for communication via at least two antenna radiation lobes, each antenna radiation lobe communicating an information stream to the at least one UE (user equipment) in the cell, thus communicating by means of MIMO (Multiple Input Multiple Output).

According to a certain aspect of the invention, this corresponds to a second mode of operation.

The objective problem is also solved by means of an array antenna arranged for use in the communication system.

Furthermore, the objective problem is also solved by means of a method according to the introduction, where the method further comprises the step: communicating at least two information streams, to the at least one UE (user equipment) in the cell, via at least two antenna radiation lobes.

According to a certain aspect of the invention, this corresponds to a second mode of operation.

That means that the decrease of SNR due to the dividing of an original information stream into two or more separate information streams is more or less recovered by use of array gain, where furthermore a relatively small amount of information regarding the channel is required.

Preferred embodiments are disclosed in the dependent claims.

Several advantages are achieved by means of the present invention, for example:
- higher bit rate capacity
- easy installation and lower site costs
- a single antenna with multiple antenna radiation lobes, pointing in different directions and being sufficiently de-correlated, is used instead of multiple antennas with single antenna radiation lobes, resulting in that the antenna surface is used efficiently, taking advantage of the antenna array gain, the whole antenna surface providing gain for each radiation lobe.

BRIEF DESCRIPTION OF THE DRAWINGS

The present invention will now be described more in detail with reference to the appended drawings, where.

PREFERRED EMBODIMENTS

Figure 1A:
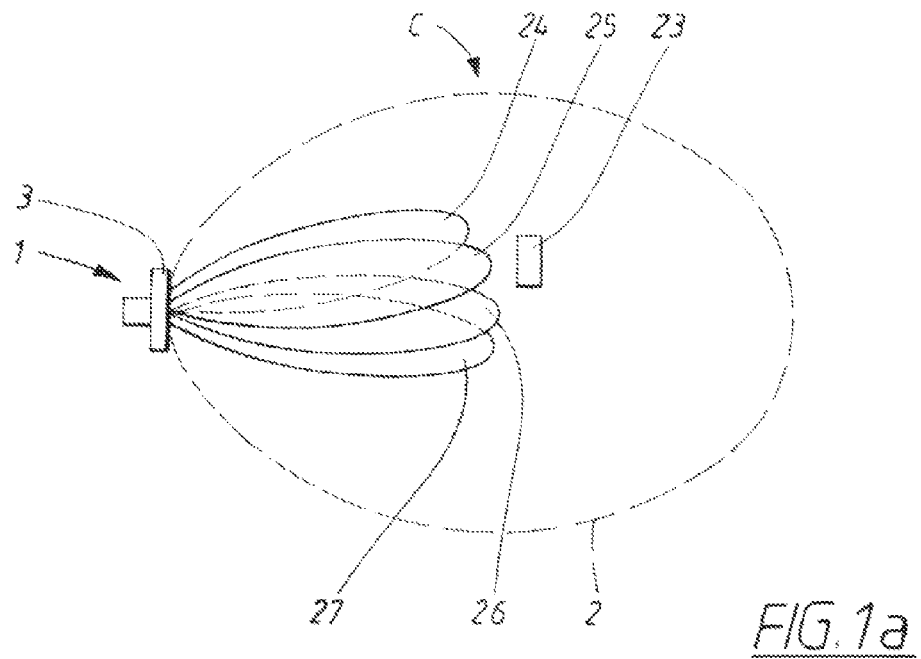
FIG. 1a shows a schematic top view of the system according to the present invention.
Figure 1B:
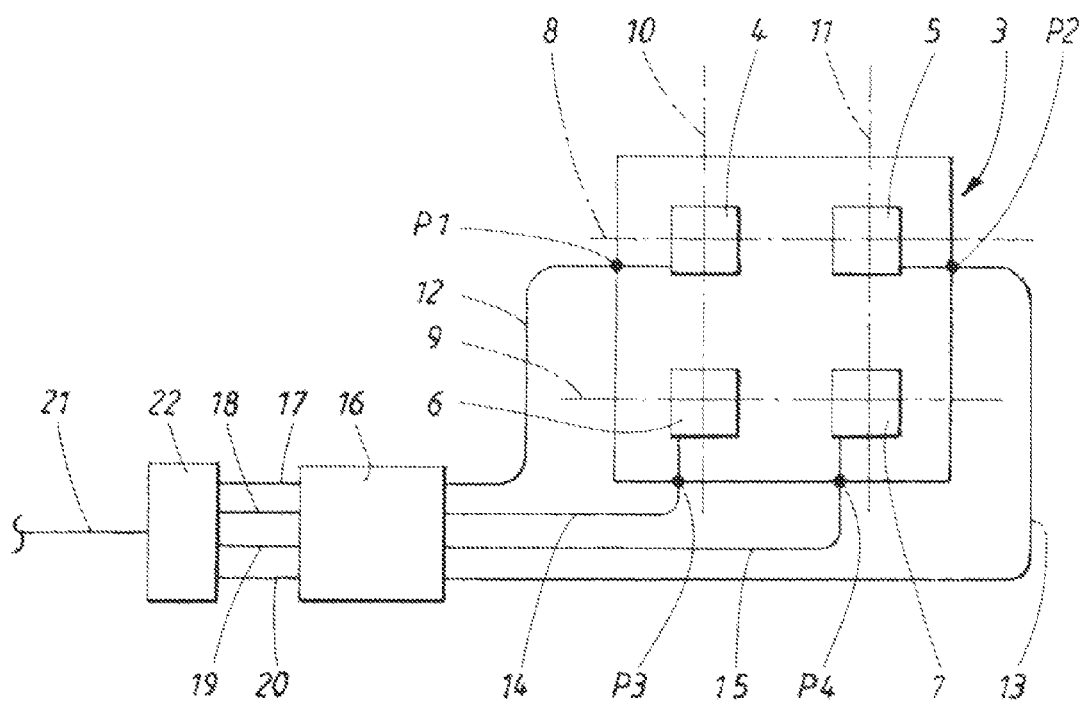
FIG. 1b shows a schematic view of a base station array antenna.

As shown in FIG. 1a, a communication system C comprises a base station 1 arranged for communication in a MIMO (Multiple Input Multiple Output) system. The base station 1 is placed in such a way that it covers a communication cell 2. With reference also to FIG. 1b, the base station 1 is equipped with an array antenna 3, which array antenna 3 in a first embodiment comprises a first 4, second 5, third 6 and fourth 7 antenna element. Each antenna element 4, 5, 6, 7 comprises at least one radiating element. The antenna elements 4, 5, 6, 7 are placed in a first 8 and second 9 row and a first 10 and second column 11, forming a 2×2 array antenna 3. The antenna elements 4, 5, 6, 7 are preferably mutually separated by approximately 0.5-1 wavelengths (calculated from the centre frequency of the frequency band for which the antennas are designed) in a horizontal plane for beam-forming in azimuth and approximately 0.5-4 wavelengths in a vertical plane for beam-forming in elevation. In this example, each antenna element 4, 5, 6, 7 is arranged for a single polarization, said polarization being essentially the same for each antenna element 4, 5, 6, 7. These antenna elements 4, 5, 6, 7 receive and transmit signals using the same frequency band, for the uplink and another frequency band for the downlink if FDD (Frequency Division Duplex) is utilized, or using the same frequency band, for both the uplink and the downlink if TDD (Time Division Duplex) is utilized.

In this first embodiment, the four antenna elements 4, 5, 6, 7 are each one connected to respective first 12, second 13, third 14 and fourth 15 feeding lines via a first P1, second P2, third P3 and fourth P4 respective antenna port, where the feeding lines 12, 13, 14, 15 are connected to a beam-forming device 16 of a previously known kind, for example a digital beam-forming device. The beam-forming device 16 is in turn connected to a first 17, second 18, third 19 and fourth 20 information stream feeding line, each information stream originating from a total information stream feeding line 21. The total information stream is divided into the four information streams by means of a dividing device 22.

One user equipment (UE) 23 is positioned within the cell 2, where the user equipment 23 for example is a mobile phone or a portable computer. It is assumed that the UE 23 is arranged for reception of four de-correlated signals, in other words it is assumed that the UE 23 is equipped with four independent antenna ports (not shown).

According to the present invention, the radiation lobes 24, 25, 26, 27 are controlled depending on the transmission circumstances for transmission between the base station 1 and the UE 23. The control is performed in such a way that an enhanced communication between the base station 1 and the UE 23 is obtained.

In the present embodiment, the beam-forming device 16 is arranged for controlling the number of output radiation lobes in such a way that one 24, two 25, three 26 or four 27 radiation lobes with fixed predetermined directions in azimuth and elevation are switched on. The number of radiation lobes and which ones that should be turned on and off is controlled in such a way that an enhanced communication between the base station 1 and the UE 23 is obtained.

In a first mode of operation, communication is performed via only one radiation lobe, communicating one information stream. Then the communication system C is not communicating via MIMO. In a second mode of operation, communication is performed via at least two antenna radiation lobes 24, 25, 26, 27, each antenna radiation lobe 24, 25, 26, 27 communicating an information stream. Then the communication system C is communicating via MIMO.

Independently on how many radiation lobes that are used, all the information from the total information stream is always radiated by the four antenna elements 4, 5, 6, 7, utilizing the full area of the antenna element's aperture.

The UE 23, which may be moving relative to the base station 1, continuously provides feed-back to the base station 1 regarding the highest data bit rate that is currently possible. Based on this information, the antenna radiation lobes 24, 25, 26, 27 are adaptively controlled. The adaptive control comprises turning radiation lobes on and off as well as distributing different power levels and/or data bit rates in each information stream.

The feed-back normally comprises relatively limited information regarding the channel, in its simplest form the feed-back is only in the form of one data bit. The more information regarding the channel that is comprised in the feed-back, the better the adaptive control becomes. It is, however, possible to achieve an acceptable adaptive control with said relatively limited information regarding the channel. A typical type of feed-back is a so-called CQI-value (Channel Quality Indicator) that is well known in the art.

In a second embodiment, which also may be implemented with reference to FIGS. 1a and 1b, the four information streams are fed to the beam-forming device 16 which here is arranged for controlling the azimuth and elevation direction for each output antenna radiation lobe 24, 25, 26, 27. The beam-forming device is in this example preferably a digital beam-forming device.

Each one of the four information streams correspond to four base station antenna radiation lobes, where each one of the lobes is directed in the direction where the optimal communication with a certain UE is achieved. The adjustment of the lobes is performed both in azimuth and elevation. Directing lobes in this way may affect the signal paths in such a way that they are not essentially de-correlated, but according to the invention they are de-correlated to a sufficient degree.

As in the first embodiment, the UE 23, which may be moving relative to the base station 1, continuously provides feed-back to the base station 1 regarding the highest transmission data bit rate that currently is possible.

Based on this information, the directions of the antenna radiation lobes 24, 25, 26, 27 are adaptively controlled.

The main goal of the invention is thus to enhance the communication, even if it means that the degree of de-correlation is decreased. De-correlation is then not preserved at the expense of communication data bit rate for all the embodiments.

According to the embodiments above, during transmission, the digital beam-forming device 16 feeds each one of the four information streams to each one of the antenna ports P1, P2, P3, P4 in the base station array antenna 3 with a certain amplitude relation and a certain phase relation in order to obtain the desired antenna radiation lobe directions in azimuth and elevation for each antenna radiation lobe 24, 25, 26, 27.

That means that, in the examples, the first information stream is fed to all four antenna ports P1, P2, P3, P4, having a certain amplitude relation and a certain phase relation for each one of the antenna ports P1, P2, P3, P4. This may be performed for all information streams at the same time, and due to superposition, four antenna radiation lobes 24, 25, 26, 27 are obtained, one for each information stream, where each antenna radiation lobe 24, 25, 26, 27 is obtained by means of the four antenna elements 4, 5, 6, 7.

In the first embodiment, no functionality for changing the direction of the antenna radiation lobes 24, 25, 26, 27 is provided, there is only the possibility to turn the antenna radiation lobes 24, 25, 26, 27, thus pointing in predetermined directions, on and off.

The digital beam-forming described above is in itself previously known, and will not be described more in detail here.

Figure 2:
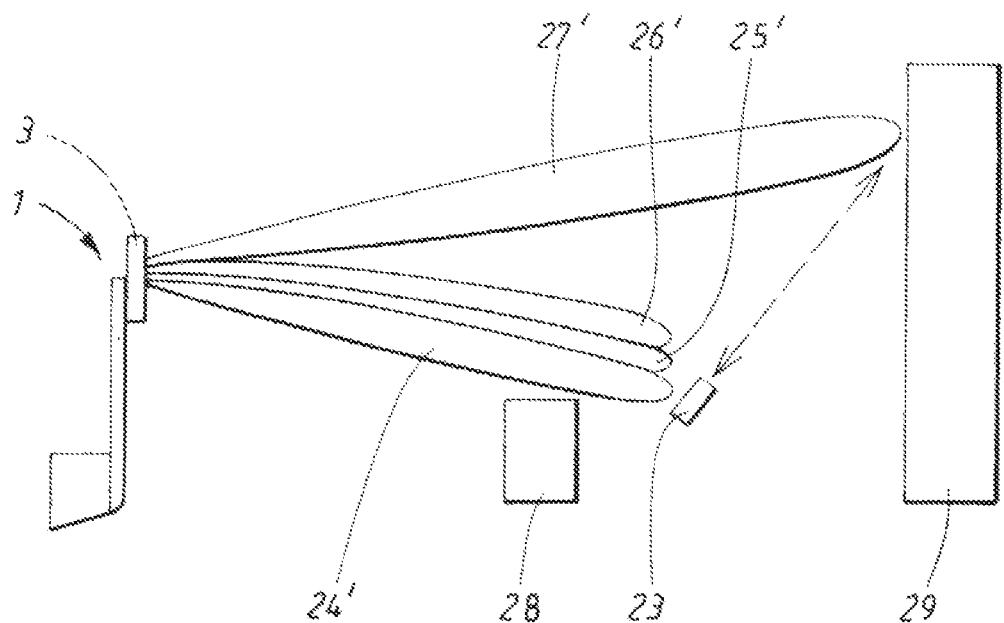
FIG. 2 shows a schematic side view of an embodiment of the invention.

As shown in the side view in FIG. 2, showing an example of the functionality of the second embodiment, a relatively small building 28 is positioned in front of a UE 23 and a large building is positioned behind the UE 23. Three antenna radiation lobes 24', 25', 26' are directed at the UE 23, having essentially the same directional angle in azimuth, but having different directional angles in elevation.

An azimuth directional angle of an antenna radiation lobe is defined as the angle between a normal extending from the centre of the antenna's main radiating surface and the azimuth direction of the antenna radiation lobe. A corresponding definition is valid for an elevation directional angle of an antenna radiation lobe. The direction of an antenna radiation lobe is preferably defined as the direction where the antenna radiation lobe has its maximum signal, other definitions occur.

Due to the smaller building 28 partly blocking the path, all four antenna radiation lobes 24', 25', 26', 27' can not achieve an optimal communication with the UE 23 by being directed more or less directly at the UE 23. Therefore, one of the antenna radiation lobes 27', the fourth antenna radiation lobe in this example, is instead directed towards the larger building 29 in such a way that the fourth information stream, which is transmitted by means of the fourth antenna radiation lobe 27', reaches the UE 23 by means of reflection in the larger building 29.

If, for example, the UE 23 clears the smaller building 28, the fourth lobe 27' is re-directed in such a way that it is directed at the UE more directly based on the feed-back from the UE 23. Then, all four antenna radiation lobes 24', 25', 26', 27' are directed at the UE 23, having essentially the same directional angle in azimuth, but having different directional angles in elevation in order to provide sufficiently de-correlated propagation paths.

Figure 3:
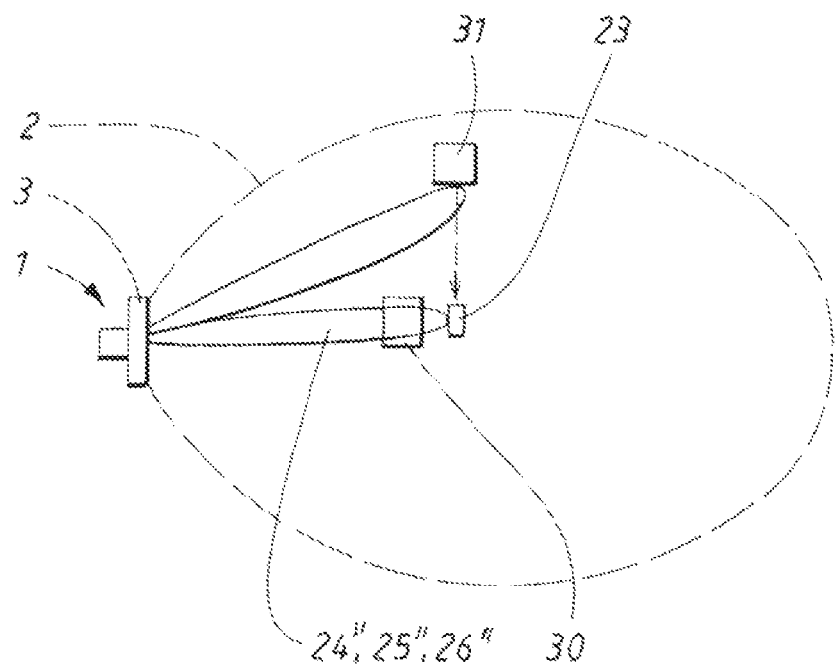
FIG. 3 shows a schematic top view of another embodiment of the invention.

As shown in the top view in FIG. 3, showing another example of the functionality of the second embodiment, a relatively small building 30 is positioned in front of a UE 23, but there are no significant buildings behind the UE 23. A relatively large building 31 is positioned on the left side of the UE 23, when looking at the UE 23 from the base station 1.

Three antenna radiation lobes 24", 25", 26" are directed at the UE 23, having essentially the same directional angle in azimuth, but having different directional angles in elevation (not shown in FIG. 3 since it is a top view). Due to the smaller building 30 partly blocking the path, all four antenna radiation lobes 24", 25", 26", 27" can not achieve an optimal communication with the UE 23 by being directed directly at the UE 23. Therefore, one of the antenna radiation lobes 27", the fourth antenna radiation lobe in this example, is instead directed towards the larger building 31 at the left in such a way that the fourth information stream, which is transmitted by means of the fourth antenna radiation lobe 27", reaches the UE 23 by means of reflection in the larger building 31 at the left, regarded from the base station 1 point of view.

In the same way as described previously, the lobe directions may be altered due to movement of the UE 23 or other circumstances. This is controlled based on the UE:s feed-back.

Figure 4:
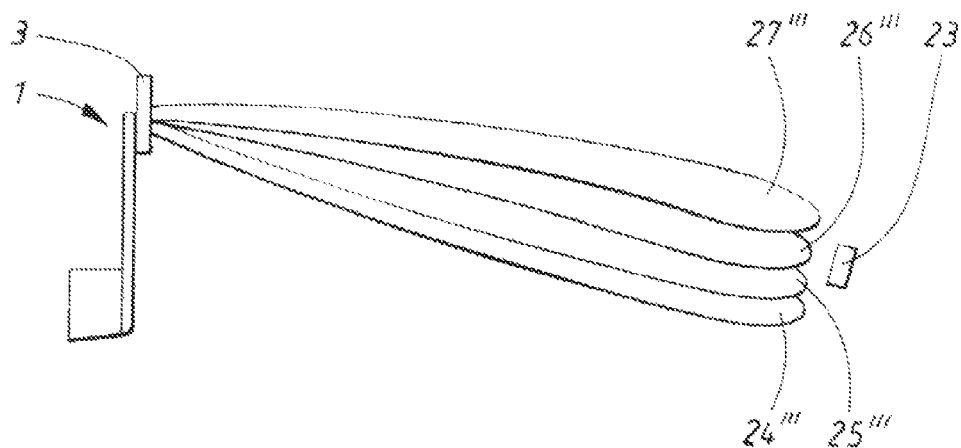
FIG. 4 shows a schematic side view of another embodiment of the invention.

As shown in the side view in FIG. 4, showing yet another example of the functionality of the second embodiment, a UE 23 is positioned in the countryside, where there are no buildings. Here, all the antenna radiation lobes 24''', 25''', 26''', 27''' are directed at the UE 23, having essentially the same directional angle in azimuth, but having different directional angles in elevation. The fourth embodiment illustrates that the present invention is not directed primarily towards reflections in buildings, but towards optimizing of the communication between the base station 1 and the UE 23, irrespective of the surroundings, and irrespective of if the degree of de-correlation is decreased.

Figure 5:
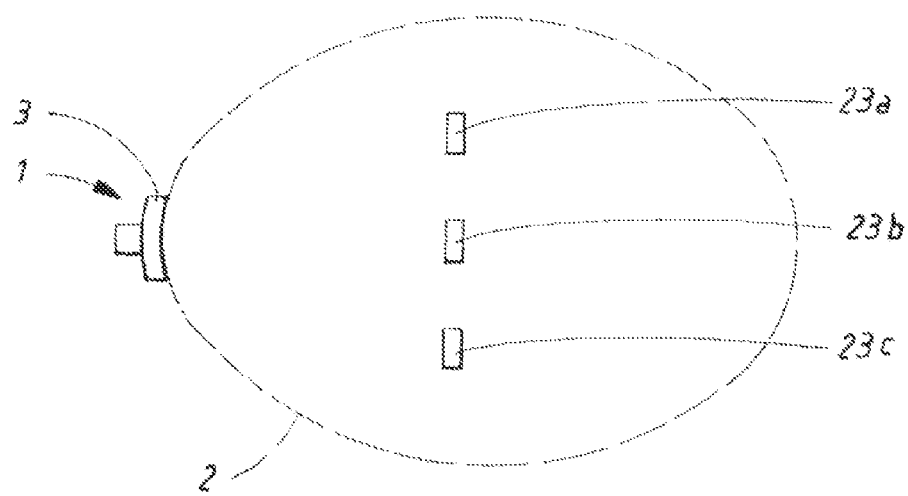
FIG. 5 shows a schematic top view of yet another embodiment of the invention.

Of course, there are often more than one UE in the cell. With reference to FIG. 5, there are a first 23a, second 23b and third 23c UE in a cell 2. According to the invention, each one of the UE:s 23a, 23b, 23c in the cell 2 receives a certain time slot where all the base station antenna radiation lobes (not shown in FIG. 5) co-operate to optimize the communication between the base station 1 and a certain UE. During a first time slot, all the base station antenna radiation lobes co-operate to optimize the communication between the base station 1 and the first UE 23a. During a second and third time slot, communication is optimized between the base station 1 and the second 23b and third 23c UE:s, respectively, in the same way. How the antenna radiation lobes are directed for each UE 23a, 23b, 23c depends on the surroundings for each UE 23a, 23b, 23c, for example if there are buildings (not shown) present. The procedure according to the above relates to a time division multiple access (TDMA) system, of course other systems such as a frequency division multiple access (FDMA) system or a combination of both, are possible.

The UE 23 may be equipped with any number of antenna ports, but in order for the UE 23 to be arranged for a MIMO system, it is necessary that the UE 23 is equipped with at least two antenna ports. When communication commences, the base station 1 adapts to the number of antenna ports available at the UE 23.

The UE 23 may be equipped with adaptive antennas, which antennas are electrically controllable in the direction where the highest data bit rate is achieved. The UE 23 may also be equipped with means (not shown) for determining which orientation of the UE 23 that provides the best communication properties.

The invention is not limited to the embodiments described above, but may vary freely within the scope of the appended claims. For example, the base station array antenna may have any suitable configuration of antenna elements, for example 4 columns and 4 rows, forming a 4×4 array antenna, thus being arranged for achieving up to sixteen antenna radiation lobes.

More generally, the base station antenna is an array antenna equipped with at least two antenna ports, where the at least two ports are connected to respective at least two corresponding antenna elements, where at least two of the at least two antenna elements have essentially the same polarization.

Thus, according to the invention, at least two antenna ports must be comprised in the base station array antenna, the base station array antenna thus being arranged for radiating two antenna radiation lobes, which is necessary for MIMO communication.

However, assuming that the first embodiment is used for the situation according to FIG. 4, it is conceivable that only one antenna radiation lobe is switched on, since no more antenna radiation lobes are necessary to achieve optimal communication between the base station 1 and the UE 23.

It is of course conceivable that the second embodiment, with controllable antenna radiation lobes, may be arranged for turning antenna radiation lobes off in the same manner as in the first embodiment.

The lobes of the base station array antenna 3 according to the second embodiment of the invention may be controllable in azimuth only, elevation only, or, as in the embodiments above, both in azimuth and elevation. As known to those skilled in the art, a base station array antenna that is controllable in both azimuth and elevation has to be two-dimensional, i.e. have antenna elements in both rows and columns.

For all embodiments, the base station array antenna 3 may further comprise dual polarized antenna elements, the base station array antenna 3 thus being arranged for communication via two essentially orthogonal polarizations, thus doubling the information stream transmission rate.

Figure 6:
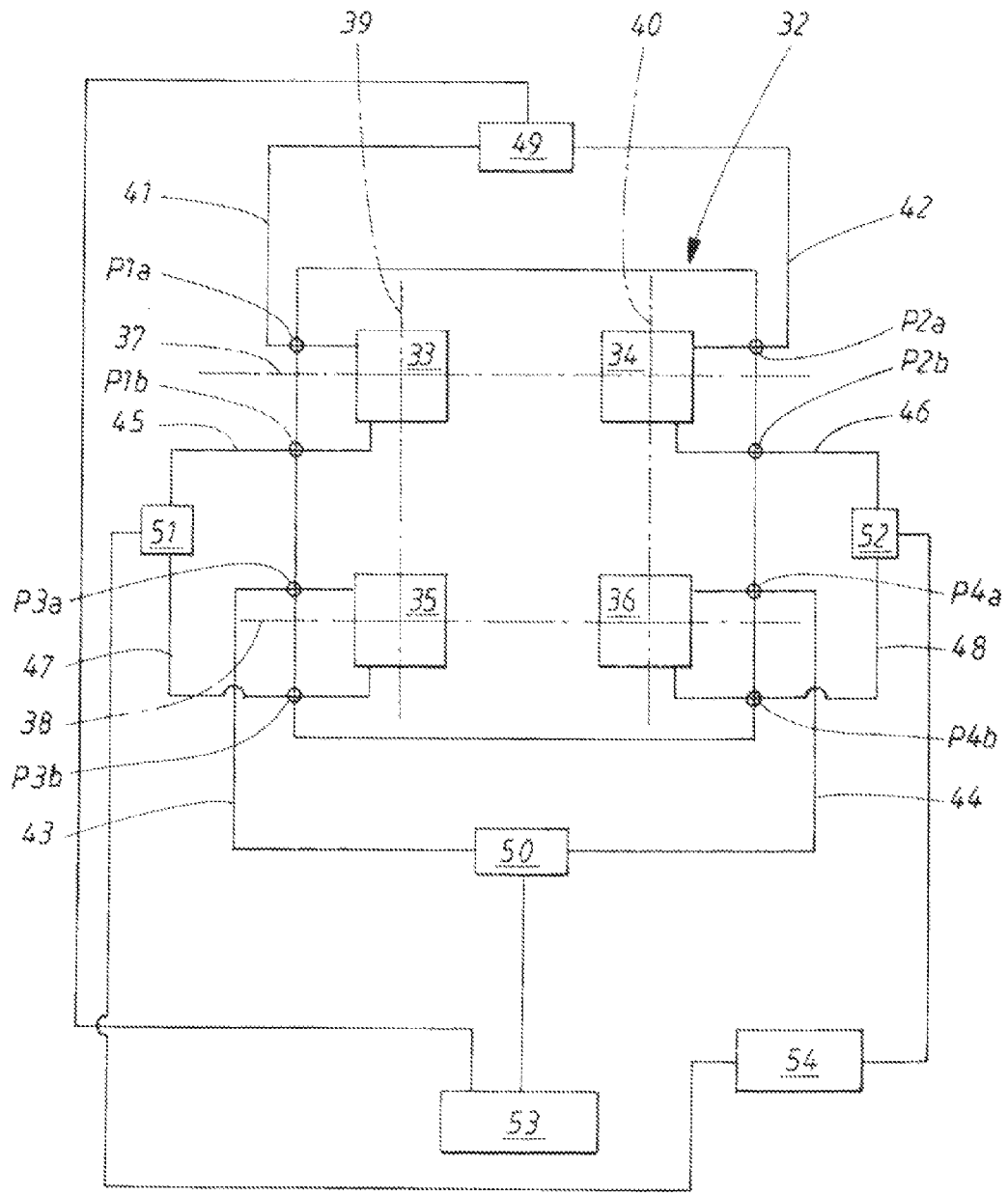
FIG. 6 shows a schematic view of a dual polarized base station array antenna.

An example of how dual polarized antenna elements can be arranged is described below with reference to FIG. 6. There, an array antenna 32 is shown, having a first 33, second 34, third 35 and fourth 36 antenna element. Each antenna element 33, 34, 35, 36 comprises at least one radiating element. The antenna elements 33, 34, 35, 36 are placed in a first 37 and second 38 row and a first 39 and second column 40, forming a 2×2 array antenna 32. The antenna elements 33, 34, 35, 36 are preferably separated by approximately 0.5-1 wavelengths (calculated from the centre frequency of the frequency band for which the antennas are designed) in the horizontal plane for beam-forming in azimuth and approximately 0.5-4 wavelengths in a vertical plane for beam-forming in elevation. Each antenna element 33, 34, 35, 36 is arranged for a first and a second polarization, the polarizations being essentially de-correlated.

The antenna elements 33, 34, 35, 36 receive and transmit signals using the same frequency band, for the uplink and another frequency band for the downlink if FDD (Frequency Division Duplex) is utilized, or using the same frequency band, for both the uplink and the downlink if TDD (Time Division Duplex) is utilized.

In this example, the first polarization of the first 33, second 34, third 35 and fourth 36 antenna element is connected to respective first 41, second 42, third 43 and fourth 44 feeding lines via respective first P1a, second P2a, third P3a and fourth P4a antenna ports. In the same way, the second polarization of the first 33, second 34, third 35 and fourth 36 antenna element is connected to respective fifth 45, sixth 46, seventh 47 and eighth 48 feeding lines via respective fifth P1b, sixth P2b, seventh P3b and eighth P4b antenna ports.

The first 41 and second 42 feeding lines, which are connected to the first polarization of the antenna elements 33, 34 in the first row 37, are connected to a first power divider 49, and the third 43 and fourth 44 feeding lines, which are connected to the first polarization of the antenna elements 35, 36 in the second row 38, are connected to a second power divider 50.

The fifth 45 and seventh 47 feeding lines, which are connected to the second polarization of the antenna elements 33, 35 in the first column 39, are connected to a third power divider 51, and the sixth 46 and eighth 48 feeding lines, which are connected to the second polarization of the antenna elements 34, 36 in the second column 40, are connected to a fourth power divider 52.

The first 49 and second 50 power dividers are connected to a first beam-forming device 53 and the third 51 and fourth 52 power dividers are connected to a second beam-forming device 54. The beam-forming devices 53, 54 are of a previously known kind, for example digital beam-forming devices. The devices 53, 54 may be combined in one beam-forming device.

By means of this arrangement, the radiation lobes formed by the rows 37, 38, having the first polarization, may be controlled separate from the radiation lobes formed by the columns 39, 40, having the second polarization. The antenna radiation beams are incoherently added in the far-field.

Generally, for all embodiments described, since all antenna arrangements are reciprocal, all features described as concerning transmission, are also applicable concerning reception.

Furthermore, the number of base station array antennas 3, base station antenna radiation lobes 24, 25, 26, 27 may vary in any convenient way, provided that the system still is arranged for MIMO.

As indicated above, the invention is applicable for an arbitrary number of UE:s 23; 23a, 23b, 23c. More than one base station 1 may also be necessary, for example due to the demands for capacity and/or the layout of the cell 2 environments.

The base station 1 may be a base station in any wireless communication system, such as a wireless local area network (WLAN).

The invention claimed is:

1. A wireless communication system, comprising:
at least one base station in a communication cell, the base station being equipped with at least one array antenna comprising at least four antenna ports, wherein the at least four ports are connected to respective at least four corresponding antenna elements arranged in at least two rows and at least two columns, wherein the array antenna is arranged for communication via at least two antenna radiation lobes, each antenna radiation lobe communicating an information stream to at least one user equipment (UE) in the cell, thus communicating by means of Multiple Input Multiple Output (MIMO), wherein each antenna radiation lobe is individually controllable both in azimuth and elevation whereby the communication of the information streams is optimized, and wherein a total information stream is fed into the communication system, and independent of how many antenna radiation lobes are used all information from said total information stream is always radiated by the at least four antenna elements.

2. The wireless communication system according to claim 1, wherein each antenna element comprises at least one radiating element.

3. The wireless communication system according to claim 1, wherein the control of the antenna lobes is performed adaptively, based on feed-back information from the UE, said feed-back information being in the form of at least one data bit.

4. The wireless communication system according to claim 3, wherein the feed-back information is in the form of a Channel Quality Indicator (CQI) value.

5. The wireless communication system according to claim 1, wherein the array antenna comprises dual polarized antenna elements.

6. The wireless communication system according to claim 5, wherein the array antenna comprises the at least four antenna elements, each antenna element having a first and second polarization, the polarizations being essentially de-correlated, the at least four antenna elements further forming at least two rows and two columns, the rows where the first polarization of the antenna elements in the first row and the first polarization of the antenna elements in the second row are connected to a first beam-forming device, and wherein the second polarization of the antenna elements in the first column and the second polarization of the antenna elements in the second column are connected to a second beam-forming device, enabling the radiation lobes formed by the rows, having the first polarization, to be controlled separate from the radiation lobes formed by the columns, having the second polarization, the antenna radiation lobes being incoherently added in far-field.

7. The wireless communication system according to claim 1, wherein the at least four antenna elements are mutually separated by approximately 0.5-1 wavelengths in a horizontal plane for beam-forming in azimuth, and wherein the at least four antenna elements are mutually separated by approximately 0.5-4 wavelengths in a vertical plane for beam-forming in elevation.

8. The wireless communication system according to claim 1, wherein each antenna radiation lobe is individually controllable for distributing at least one of different power levels and data bit rates in each information stream.

9. The wireless communication system according to claim 1, wherein each antenna radiation lobe is individually controllable such that they are not essentially de-correlated.

10. The method according to claim 1, wherein the at least four antenna elements have essentially the same polarization.

11. An array antenna arranged for use in a communication system, the array antenna comprising:
at least four antenna ports, wherein the at least four ports are connected to respective at least four corresponding antenna elements arranged in at least two rows and at least two columns, wherein the array antenna is arranged for communication via at least two antenna radiation lobes, each antenna radiation lobe communicating an information stream to at least one user equipment (UE) in the cell, thus communicating by means of Multiple Input Multiple Output (MIMO), wherein each antenna radiation lobe is individually controllable both in azimuth and elevation whereby the communication of the information streams is optimized, and wherein a total information stream is fed into the communication system, and independent of how many antenna radiation lobes are used all information from said total information stream is always radiated by the at least four antenna elements.

12. The array antenna according to claim 11, wherein the at least four antenna elements are mutually separated by approximately 0.5-1 wavelengths in a horizontal plane for beam-forming in azimuth, and wherein the at least four antenna elements are mutually separated by approximately 0.5-4 wavelengths in a vertical plane for beam-forming in elevation.

13. The array antenna according to claim 11, wherein each antenna radiation lobe is individually controllable for distributing at least one of different power levels and data bit rates in each information stream.

14. The array antenna according to claim 11, wherein each antenna radiation lobe is individually controllable such that they are not essentially de-correlated.

15. The array antenna according to claim 11, wherein the at least four antenna elements have essentially the same polarization.

16. A method for communication of at least two information streams from a base station array antenna in a communication cell to at least one user equipment (UE) in the cell, wherein the method comprises the steps of:
providing the base station array antenna which comprises at least four antenna ports, wherein the at least four ports are connected to respective at least four corresponding antenna elements arranged in at least two rows and at least two columns, wherein the array antenna is arranged for communication via at least two antenna radiation lobes, each antenna radiation lobe communicating an information stream to at least one user equipment (UE) in the cell, thus communicating by means of Multiple Input Multiple Output (MIMO);
communicating, via at least two antenna radiation lobes, the at least two information streams to the at least one user equipment (UE) in the cell; and
individually controlling each antenna radiation lobe both in azimuth and elevation whereby the communication of the information streams is optimized, and wherein a total information stream is fed into the communication system, and independent of how many antenna radiation lobes are used all information from said total information stream is always radiated by the at least four antenna elements.

17. The method according to any claim 16, wherein the antenna lobes are controlled adaptively, using feed-back information from the UE, said feed-back information being in the form of at least one data bit.

18. The method according to claim 17, wherein the feed-back uses a Channel Quality Indicator (CQI) value.

19. The method according to claim 16, wherein dual polarization is used.

20. The method according to claim 16, wherein the at least four antenna elements are mutually separated by approximately 0.5-1 wavelengths in a horizontal plane for beam-forming in azimuth, and wherein the at least four antenna elements are mutually separated by approximately 0.5-4 wavelengths in a vertical plane for beam-forming in elevation.

21. The method according to claim 16, wherein each antenna radiation lobe is individually controllable for distributing at least one of different power levels and data bit rates in each information stream.

22. The method according to claim 16, wherein each antenna radiation lobe is individually controllable such that they are not essentially de-correlated.

23. The method according to claim 16, wherein the at least four antenna elements have essentially the same polarization.

* * * * *

UNITED STATES PATENT AND TRADEMARK OFFICE
CERTIFICATE OF CORRECTION

| | | |
|---|---|---|
| PATENT NO. | : 9,107,082 B2 | Page 1 of 1 |
| APPLICATION NO. | : 14/153431 | |
| DATED | : August 11, 2015 | |
| INVENTOR(S) | : Andersson et al. | |

It is certified that error appears in the above-identified patent and that said Letters Patent is hereby corrected as shown below:

In the Claims

In Column 9, Line 50, in Claim 10, delete "method" and insert -- wireless communication system --, therefor.

In Column 10, Line 46, in Claim 17, delete "to any claim" and insert -- to claim --, therefor.

Signed and Sealed this
Twenty-eighth Day of June, 2016

Michelle K. Lee
*Director of the United States Patent and Trademark Office*